May 30, 1939. W. S. LEMMON Re. 21,103
COMMUNICATION SYSTEM
Original Filed Feb. 15, 1934
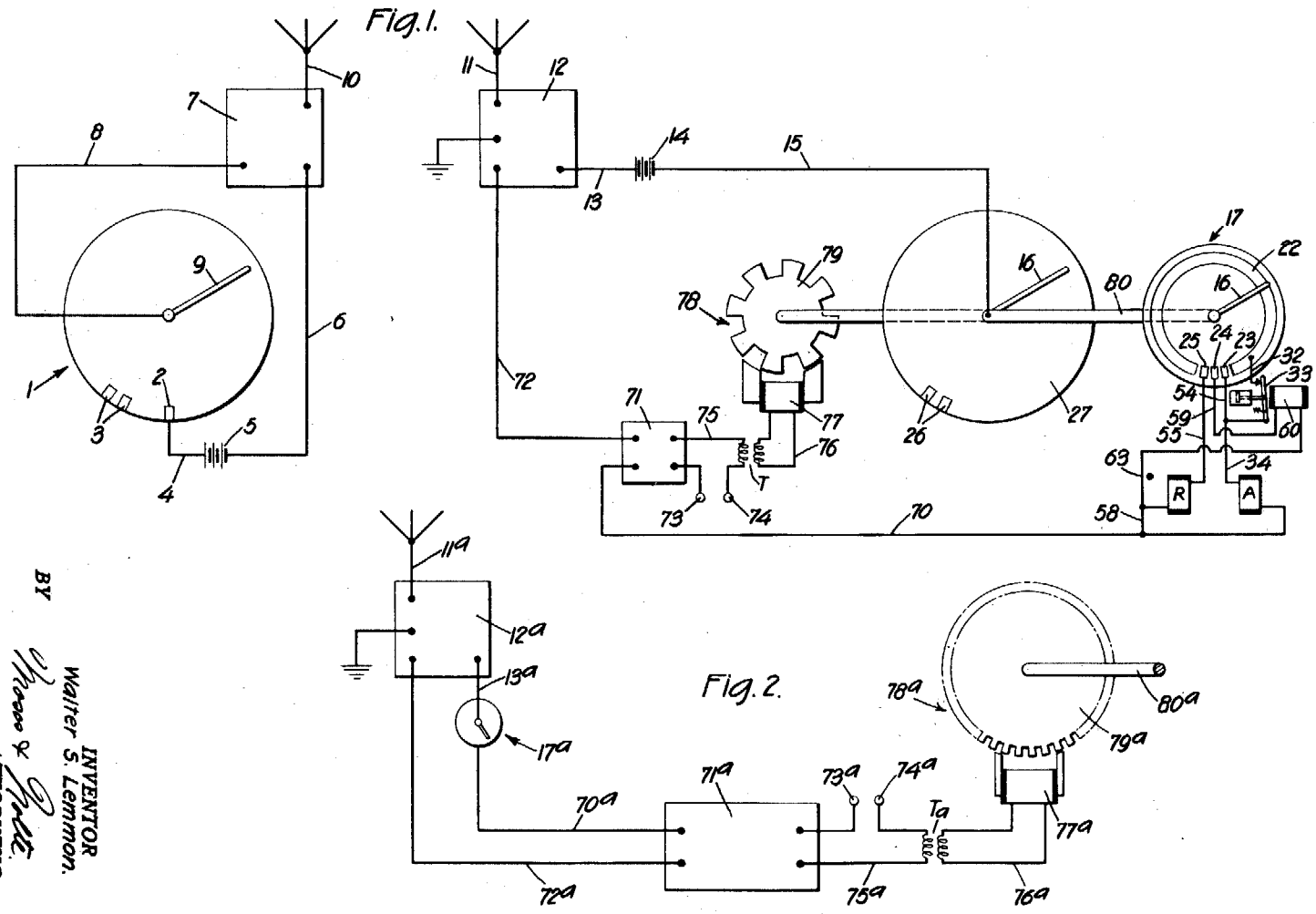
INVENTOR
Walter S. Lemmon.
BY Moore & Hollt.
ATTORNEYS Reissued May 30, 1939 Re. 21,103

UNITED STATES PATENT OFFICE 21,103

COMMUNICATION SYSTEM

Walter S. Lemmon, New York, N. Y., assignor, by mesne assignments, to International Business Machines Corporation, New York, N. Y., a corporation of New York Original No. 2,000,765, dated May 7, 1935, Serial No. 711,313, February 15, 1934. Application for reissue January 14, 1937, Serial No. 120,620

13 Claims. (Cl. 178—69.5)

This invention relates to communication systems employing synchronous, in-phase operation of a transmitter and a receiver, and applies particularly to a system wherein the intelligence is conveyed by electrical impulses identified by their timing with reference to an arbitrary time scale.

For such a system it is desirable that the sender include a cyclical impulse controlling means which is operated at a uniform cyclical rate and that the receiver include a cyclical impulse distributing means which is actuated at the same cyclical rate.

In accordance with the present invention, correspondence between the cyclical rates, and phase correspondence as between the impulse controlling means and the impulse distributing means, is secured by causing an actuating impulse to be transmitted by the cyclical impulse controlling means at a predetermined point in each cycle of the cyclical impulse controlling means, and by providing in the receiver an actuating means for the distributor, which causes said distributor to operate at the same cyclical rate as the impulse controlling means, by energy supplied at the frequency of the received actuating impulses.

It is a feature of the invention that the actuating impulses and the signal impulses which are received with the sender and receiver in phase correspondence are separated and distinguished by the receiver so that the signal impulses are not permitted to affect the means for actuating the cyclical impulse distributing means.

It is a further feature of the invention that provision is made in the receiver of frequency multiplying means and of means for operating the distributing means responsive to the multiplied frequency of the operating impulses to operate the distributing means at the same rate as the sending collector.

Other objects and advantages will hereinafter appear.

In the drawing forming part of this specification,

Fig. 1 is a diagrammatic view illustrating the sending and receiving apparatus; and Fig. 2 is a fragmentary diagrammatic view illustrating another form of apparatus embodying features of the invention.

The sender comprises a commutator ring 1 which includes an operating-impulse contact 2 and a multiplicity of signal contacts 3 of which only a few are illustrated. The operating-impulse contact is connected through a conductor 4 to a battery 5, thence through a conductor 6 to a suitable transmitting or broadcasting means indicated by the rectangle 7. The transmitting means 7 is connected by conductor 8 with the hub portion of a cyclical impulse controlling device 9. The battery 5 is effective to produce an impulse through the transmitting means 7 each time that the controller arm 9 wipes across the contact 2. The controller arm 9 rotates at uniform speed and hence the operating impulses are sent out at uniform time intervals.

Between successive operating impulses the controller arm 9 wipes across all of the signal contacts 3 in predetermined order completing a circuit through the transmitter 7 as it touches each contact. The contacts 3 are adapted to be selectively charged by means not shown, and any such contact that is charged will cause an impulse to be sent out as the controller arm 9 wipes across it. Such an impulse will obviously be timed with reference to the operating impulse, in accordance with the position of the particular character contact which is charged. These character contacts are so disposed around the circumference of the controlling device that they are separated from the operating-impulse contact 2 by a time distance greater than the length of the operating-impulse.

The sender may be used in line telegraphy or carrier current systems, or for radio. A radio antenna 10 is indicated.

In the receiver, an antenna 11 is connected to an amplifier 12 and this amplifier is connected through a conductor 13 to a battery 14. The battery 14 is in turn connected through a conductor 15 with the hub portion of a rotary distributor arm 16. The distributor arm 16 carries two brushes which are electrically connected to one another. One of these brushes is adapted to wipe across contacts 26 which are mounted on a stationary disc 27 and which correspond in their positions with the signal contacts 3 of the sender. The other brush forms part of a device 17 which closes a circuit between conductor 15 and either a ring segment 22 or contacts 23, 24 and 25.

The ring segment 22 and the contacts 23, 24 and 25 are the same as the correspondingly numbered parts disclosed in my pending application, Serial No. 684,362, filed August 19, 1933, for Synchronizing system. In said application disclosure is made of the idea of utilizing what are referred to herein as the actuating impulses, for adjusting the receiving distributor into phase correspondence with the sending distributor. In the present apparatus they may serve the same purpose, but they are additionally utilized (amplified) to actually drive the distributor arm 16. The ring segment 22 and the contacts 23, 24 and 25, together with the circuits thereof, constitute in said application a means for adjusting the arm 16 a step forward with relation to the sending controlling device, each time that an actuating impulse comes through on the ring segment 22 or the contact 23, and for adjusting the arm 16 a step backward with relation to the sending collector each time that an actuating impulse comes through on the contact 25. In normal in-phase operation, the actuating impulses come through ordinarily on the contact 24, but may occasionally come through on the contact 23 or contact 25. Such impulses never come through on the ring segment 22 after phase correspondence has once been secured. Signal impulses are not transmitted until the phase correspondence has been secured at which time the ring segment 22 is open circuited to render it inoperative.

In normal operation, the actuating impulses are transmitted through a conductor 59, an electromagnet 60, and conductors 63 and 58 to a conductor 70. The conductor 70 is connected to one terminal of an amplifier 71. The other terminal of the amplifier 71 is connected through a conductor 72 to a terminal of the amplifier 12 to complete the output circuit of the amplifier 12.

The electromagnet 60 normally holds up an armature 33 against the force of a spring. The ring segment 22 is provided with a contact 32 with which the armature 33 is adapted to engage when released by the electromagnet 60. When the apparatus is first set into operation, and before any letter impulses have been transmitted, the actuating impulses may be transmitted through the ring segment 22, contact 32 and armature 33 to a conductor 34. Such current passes thence through an advancing relay A to conductor 70. As soon as in-phase operation is produced, however, the actuating impulses are transmitted through contact 24 and electromagnet 60 so that armature 33 is held away from contact 32. This condition is maintained so long as in-phase operation continues, the result being that no impulses transmitted while the arm 16 is in register with the ring segment 22 can get through to conductor 70. When an impulse is transmitted with the arm 16 engaging contact 23, the current travels through advancing relay A, causing in-phase operation to be immediately restored. This single cycle interruption of the normal circuit through 24 is not of sufficient duration to permit armature 33 to move into engagement with contact 32. Similarly, when the actuating impulse is transmitted from arm 16 through contact 25, the current passes through a conductor 55, retarding relay R and conductor 58 to conductor 70, causing in-phase operation to be restored while maintaining the ring segment 22 inoperative.

The mechanism just described is effective both to prevent signal impulses from reaching the amplifier 71, and to transmit power actuating impulses to said amplifier. Line current is applied to said amplifier from line terminals 73 and 74, and the output circuit 75 of the amplifier is connected through a transformer T with a circuit 76 which includes the field winding 77 of a phonic motor 78. The rotor 79 of this motor is connected through suitable gearing (not shown) to drive the shaft 80 of the distributing arm 16. The characteristics of the motor 78 are such that it is adapted to be responsive to current of the frequency of the operating impulses, and to respond to current of such frequency by driving the shaft 80 at the same rotary speed as that at which the controller arm 9 of the sender is driven.

In the embodiment of Figure 2 the sending apparatus may be the same as that of Figure 1 and hence has not been illustrated. The receiving apparatus is also the same as that of Figure 1 with the exception of certain features which will be referred to below. The receiver comprises an antenna 11*a* and an amplifier 12*a*. The current is transmitted through a conductor 13*a* and a device 17*a*, 27*a* to a conductor 70*a* which is connected to one terminal of an amplifier and frequency multiplier 71*a*. Any one of the several types of frequency multipliers well known in the art may be employed, such, for example, as the magnetic doubler type or the vacuum tube type. A conductor 72*a* connects the opposite terminal of the amplifier and frequency multiplier 71*a* with the amplifier 12*a*, completing the output circuit of the amplifier 12*a*. The frequency multiplier and amplifier 71*a*, both of which may be of any suitable type well known in the art, are supplied with current from line terminals 73*a* and 74*a*, and the output circuit 75*a* is inductively connected through transformer T*a* with a circuit 76*a* which includes the field winding 77*a* of a phonic motor 78*a*. The motor includes a rotor 79*a* which is connected to drive the shaft 80*a* upon which the distributor arm (not shown) is mounted. The rotor 79*a* may be provided as shown in Figure 2 with a larger number of segments than the rotor 79 of Figure 1. The increase in number may correspond to the frequency multiplications effected by the frequency multiplier. In such case the effect of frequency multiplication is to produce a finer degree of responsiveness to the operating impulses and a smoother application of power. If preferred, however, the frequency multiplication may be utilized to alter in an advantageous manner the gearing employed, or possibly to obviate the need for gearing. This feature of stepping up the frequency is an important feature where more than one impulse per revolution of the sending controller is wanted, since it is desirable to avoid the complications which would be introduced by attempting to transmit from the sender a plurality of operating impulses in a single revolution of the sending controller.

I have described what I believe to be the best embodiments of my invention. I do not wish, however, to be confined to the embodiments shown, but what I desire to cover by Letters Patent is set forth in the appended claims.

I claim:

1. In a system for conveying intelligence by electrical impulses, in combination, a sender comprising an electrical impulse controller operating at uniform speed and a receiver comprising a signal impulse assorting distributor adapted to operate at substantially the same speed, said system including means in the sender for transmitting an electrical distributor-operating impulse at a predetermined point in each cycle and electrical signal impulses at other times, means in the receiver responsive to the reception of the operating impulses to rotate the distributor at the same speed as the sending controller, and in phase correspondence therewith, and said distributor including means effective at phase correspondence for discriminating between and assorting the electrical impulses actuating and the several electrical signalling impulses.

2. In a system for conveying intelligence by electrical impulses, in combination, a sender comprising an electrical impulse controller operating at uniform speed and a receiver comprising a signal impulse assorting distributor adapted to operate at substantially the same speed, said system including means in the sender for transmitting an electrical distributor-operating impulse at a predetermined point in each cycle, means in the receiver responsive to reception of the operating impulses to rotate the distributor at the same speed as the sending controller, means in the receiver for initially transmitting the operating impulses through to the operating means regardless of the phase relation of the sender and the receiver, means for adjusting the receiver into phase correspondence with the sender, and means for thereafter excluding from the operating means electrical impulses transmitted in the interval between successive operating impulses.

3. In a system for conveying intelligence by electrical impulses, in combination, a sender comprising a controller operating at uniform speed and a receiver comprising an electrical signal impulse assorting distributor adapted to operate at the same speed, said system including means in the sender for transmitting an electrical distributor-operating impulse at a predetermined instant in each cycle and signal impulses at other times, means in the receiver responsive to reception of the operating impulses to rotate the distributor at the same speed as the sending controller and in phase correspondence therewith, and means in the receiver effective at phase correspondence for excluding from the operating means impulses received between successive operating impulses.

4. In a system for conveying intelligence by electrical impulses, in combination, a sender and a receiver comprising an electrical signal impulse assorting rotary distributor adapted for operation at a predetermined uniform speed, said system including means in the sender for transmitting electrical distributor-operating impulses at uniform time intervals, and electrical signal impulses between successive operating impulses, means in the receiver responsive to said operating impulses to operate the distributor, and means in the receiver effective at phase correspondence of the sender and receiver for preventing electrical signal impulses from affecting the distributor operating means.

5. In a system for conveying intelligence by electrical impulses, in combination, a sender and a receiver, said receiver including a rotary electrical signal impulse assorting distributor and means for rotating the same, and said sender including means for transmitting electrical distributor-operating impulses at uniform time intervals, and means in the receiver for utilizing the electrical operating impulses both to actuate the distributing means of the receiver and to maintain phase correspondence of the receiver with the sender.

6. In a system for conveying intelligence by electrical impulses, in combination, a sender comprising means for transmitting electrical operating impulses at uniform time intervals and electrical signal impulses at other times, and a receiver comprising a rotary signal impulse distributor, means for operating the distributor, a source of electrical energy, and means controlled by the operating impulses for causing energy from said source to be supplied periodically to the distributor-operating means, and means, effective at phase correspondence of the sender and receiver, for discriminating between and assorting the several electrical signal impulses and the electrical operating impulses.

7. In a system for conveying intelligence by electrical impulses, in combination, a sender comprising a collector operating at uniform speed and a receiver comprising a signal impulse distributor adapted to operate at substantially the same speed, means in the sender for transmitting a distributor-operating impulse at a single predetermined point in each cycle, and for sending signal impulses between successive operating impulses, means in the receiver for receiving the operating impulses and multiplying the frequency of the same, means responsive to such multiplied frequency to rotate the distributor at the same speed as the sending collector, and means effective at phase correspondence of the sender and distributor for discriminating between the signalling and actuating impulses.

8. In a system for conveying intelligence by eletrical impulses, in combination, a sender comprising a cyclical electrical impulse controlling means, operating at a uniform cyclical electrical rate and a receiver comprising a cyclical signal impulse distributing means adapted to operate at substantially the same cyclical rate, said system including means in the sender for transmitting an electrical distributor actuating impulse at a predetermined point in each cycle and electrical signal impulses at other times, and means in the receiver responsive to the reception of the actuating impulses to actuate the distributing means at the same cyclical rate as the sending impulse controlling means and in phase correspondence therewith, said distributing means being effective at phase correspondence for assorting the actuating impulses and the several signaling impulses, according to their timing.

9. In a system for conveying intelligence by electrical impulses, in combination, a sender comprising a cyclical impulse controlling means operating at uniform cyclical rate and a receiver comprising a cyclical electrical signal impulse distributing means, adapted to operate at the same cyclical rate, said system including means in the sender for transmitting an electrical distributor-actuating impulse at a predetermined instant in each cycle and electrical signal impulses at other times, means in the receiver responsive to reception of the electrical actuating impulses to actuate the distributor at the same cyclical rate as the said sending impulse controlling means, and in phase correspondence therewith, and means in the receiver effective at phase correspondence for excluding from the distributor actuating means, electrical impulses received between successive electrical actuating impulses, and for assorting the electrical signaling impulses according to their timing.

10. In a system for conveying intelligence by electrical impulses, in combination, a sender and a receiver, said receiver including a cyclical electrical signal impulse distributing means for transmitting electrical signal impulses to diverse destinations according to their individual timing relative to the electrical actuating impulses, and means for actuating the distributing means, and said sender including means for transmitting distributor actuating electrical impulses at uniform time intervals, and means in the receiver for utilizing the electrical actuating impulses both to actuate the distributing means of the receiver and to maintain phase correspondence of the receiver with the sender.

11. In a system for conveying intelligence by electrical impulses, in combination, a sender comprising means for transmitting electrical actuating impulses at uniform time intervals and timed, electrical signal impulses at other times, and a receiver comprising a cyclical electrical signal impulse distributing means, means for actuating said distributor means, a source of electrical energy, means controlled by the actuating impulses for causing energy from said source to be supplied periodically to the distributor actuating means, and means effective at phase correspondence of the sender and distributor for assorting the timed electrical signal impulses and the electrical actuating impulses according to their timing.

12. A system for transmitting intelligence by electrical impulses having, in combination, a sender, comprising a cyclical impulse controlling means normally actuated at a substantially uniform cyclical rate for making a single transmitting channel exclusively available for the transmission of an actuating impulse in the first period of each cycle and for making said channel exclusively available during the ensuing periods of a cycle to individual signal impulse sources of the sender one after another, in predetermined sequence, whereby each impulse is transmitted individually and not superposed in whole or in part upon any other impulse, and a receiver comprising a cyclical impulse distributor and actuating means therefor, said actuating means maintaining the distributor in phase with the controlling means of the sender in response to the actuating impulses, and said distributor acting to place the transmitting channel exclusively in communication with the distributor actuating means during the first period of each cycle and to place each of a multiplicity of signal impulse operated circuits individually in exclusive communication with the transmitting channel in predetermined sequence during the ensuing periods of the distributor cycle, the actuating impulses serving to actuate and time the distributor cycle for cycle and period for period with the sender controlling means.

13. A system for transmitting intelligence comprising the combination with a single transmitting channel, of a sender, and a receiver, said sender comprising control means for transmitting actuating impulses through the single transmitting channel to the sender at regular, widely separated periods each marking the beginning of a sender cycle, and for making the single transmitting channel available in predetermined sequence to each of a multiplicity of signal impulse originating sources during distinct ensuing periods of each cycle so that each signal source is allotted a definite period in each cycle, with the result that each impulse is transmitted individually in a definite period and may be identified with its particular source at the receiver by its timing, and the receiver including cyclical distributing means actuated by the actuating impulses received from the sender in the first period of each sender cycle to set up a distributing cycle corresponding in duration and also period for period with the controlling means of the sender, to allot to each of a multiplicity of signal responsive instrumentalities a predetermined period of each cycle, whereby each impulse responsive instrumentality of the receiver, including both the actuating means for the distributing means and the signal responsive instrumentalities, is made accessible to impulses only during the sending period of a particular impulse source of the sender, and is maintained inaccessible at all other times.

WALTER S. LEMMON.

CERTIFICATE OF CORRECTION.

Reissue No. 21,103. May 30, 1939.

WALTER S. LEMMON.

It is hereby certified that error appears in the printed specification of the above numbered patent requiring correction as follows: Page 3, first column, line 2, claim 1, for the words "impulses actuating" read actuating impulses; same page, second column, line 26, claim 8, for "eletrical" read electrical; line 28, same claim, strike out "electrical" and insert the same after "cyclical" in line 29, same claim 8; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.